United States Patent [19]

Brabbs et al.

[11] 4,360,534
[45] Nov. 23, 1982

[54] METHOD OF PROVIDING SOFT FLAVOR CHIPS IN AGED COOKIES AND COMPOSITION THEREOF

[75] Inventors: William J. Brabbs, Springfield, Ohio; Frances H. Savage, Lawrenceburg, Ind.; James P. Smith, College Hill, Ohio

[73] Assignee: The Proctor & Gamble Co., Cincinnati, Ohio

[21] Appl. No.: 238,898

[22] Filed: Mar. 2, 1981

[51] Int. Cl.³ .............................................. A21D 2/16
[52] U.S. Cl. .................................... 426/560; 426/653
[58] Field of Search ............................. 426/552–554, 426/602, 603, 611–612, 653–654, 555, 560

[56] References Cited

U.S. PATENT DOCUMENTS

| | | | |
|---|---|---|---|
| 1,971,886 | 8/1934 | Votaw et al. | 426/553 |
| 2,132,396 | 10/1938 | Coith et al. | 426/553 |
| 2,532,523 | 12/1950 | Trempel | 426/553 |
| 2,586,615 | 2/1952 | Cross | 426/103 |
| 2,626,216 | 1/1953 | Cross | 426/654 |
| 2,864,703 | 12/1958 | Schulman | 426/553 |
| 2,874,052 | 2/1959 | Bedenk | 426/554 |
| 2,975,059 | 3/1961 | Andrews | 426/555 |
| 3,145,107 | 8/1964 | Howard | 426/611 |
| 3,415,659 | 12/1968 | Purves | 426/610 |
| 3,508,926 | 4/1970 | Werbin et al. | 426/297 |
| 3,533,802 | 10/1970 | Cooper et al. | 426/553 |
| 3,549,387 | 12/1970 | Howard | 426/263 |
| 3,759,717 | 9/1973 | Buddemeyer et al. | 426/549 |
| 3,794,741 | 2/1974 | Weigle | 426/555 |

FOREIGN PATENT DOCUMENTS 50-89886 of 1975 Japan.
846777 8/1960 United Kingdom ................ 426/602
855310 of 1960 United Kingdom.

OTHER PUBLICATIONS

M. Wootton, et al., Chem. Ind., 32, 1052–1053 (1970).
Y. Nakamishi and S. Shiomi, Rev. Int. Choc., 26, 50, 218–220, (1971).
Tsen, et al., Cereal Chem., 52, (5), 629–637 (1975).
CA 86:42052z.
Daoust, et al., Cereal Chem., 55 (2), 255–258 (1978).
T. Wacquez, The Manufacturing Confectioner, 55, 19 (1975).
Tsen, et al., The Bakers Digest, Aug. 1973, pp. 34–39.
Hutchinson, et al., J. Food Science, 42, (2), 399–401 (1977).

Primary Examiner—Raymond N. Jones
Assistant Examiner—Elizabeth A. Hatcher
Attorney, Agent, or Firm—Richard C. Witte; Michael J. Roth; Steven J. Goldstein

[57] ABSTRACT

High emulsifier levels and fluid shortening in baked good dough provide a shortening-continuous dough system, which markedly enhances shortening transfer in the baked goods. After the dough is baked, the fluid shortening readily transfers from the baked dough matrix to the incorporated flavor chips or a mixture thereof, making their texture desirably soft during storage.

50 Claims, No Drawings

4,360,534

METHOD OF PROVIDING SOFT FLAVOR CHIPS IN AGED COOKIES AND COMPOSITION THEREOF

TECHNICAL FIELD

A number of popular baked-goods formulations contain flavor chips. These include chocolate chip or Toll House TM cookies, as well as oatmeal and other cookies containing the more recently available butterscotch- and peanut-butter-flavored chips. These chips are composed almost entirely of fat (typically cocoa butter or a synthetic substituted), sugars, and flavoring materials.

In conventional baked products containing flavor chips, the chips melt during baking and remain in a semi-fluid state for several hours after baking, and then resolidify. During this freshly baked period, such products are preferred by consumers as being fresher and having a stronger chip-flavor impact.

This invention provides a means of predictably and rapidly forming a semi-fluid flavor chip in baked products of extended age. By the practice of this invention, it is possible to provide a chip texture approximating freshly baked in a ready-to-serve product. A particularly important aspect of this invention is the fact that the softening takes place after baking, thereby requiring no special formulation or handling of the chips themselves.

In particular, it has been discovered that certain emulsifiers, when present at sufficiently high levels, interact with free water in dough systems. When this particular emulsifier-water system is present in the dough, the result is a shortening-continuous dough system in which the chips are wetted by the shortening. When the shortening system is sufficiently fluid, migration of this fluid shortening into the flavor chips is greatly enhanced after baking. Once in the chip, the fluid shortening commingles with the fat in the chips to produce a semi-fluid texture.

BACKGROUND ART

A Japanese patent application laid open for examination, No. 89,886 (1975) discloses the use of a sucrose fatty acid ester at levels of up to 0.3% to emulsify fat and oil in sugar syrup. Candies made thereby do not stick to teeth.

U.S. Pat. No. 2,586,615, Cross (Pennsylvania Manufacturing Confectioners' Association, 1952), teaches the blending of emulsifier directly into chocolate to achieve "bloom" control. U.S. Pat. No. 2,626,216, Cross (Atlas Powder Company, 1953) is similar.

M. Wootton, et al., Chem. Ind., 32, 1052-3 (1970) describes the mechanism of fat migration in chocolate enrobed goods. The article indicates that migration of fat from a biscuit base into enrobing chocolate is related to the liquid fat content of the biscuit.

British Patent No. 855,310, Radley (Ilford, Ltd., 1960) relates to the use of emulsifiers (partial fatty acid esters of sucrose) to reduce the viscosity of chocolate.

U.S. Pat. No. 3,533,802, Cooper et al. (CPC International 1970) describes a stable oil in water emulsion containing shortening, an aqueous sugar solution, and up to 2.5% water-soluble or water-dispersible emulsifiers. The emulsions are taught for use in producing baked goods, including cookies.

DISCLOSURE OF THE INVENTION

This invention provides a flavor chip-containing baked-good dough having improved flavor chip texture after baking, comprising (a) sugar; (b) flour; (c) shortening fluid at baked good storage tempertures; (d) 15–60%, by weight of the shortenting, of water;(e)flavor chips comprising sugar, fat and flavor ingredients, and being solid at baked-goods storage temperatures; and (f) sufficient emulsifier active at dough mixing temperatures to render the dough system shortening-continuous.

The present invention also provides a method for rendering soft the flavor chips in a baked good made from dough comprising sugar, flour, shortening, water and flavor chips, comprising the steps of (a) incorporating a substantial portion of the shortening in the dough in a form which is a fluid at baked-good storage temperatures; and (c) adding to the dough sufficient emulsifier to render the dough system shortening-continuous at the dough mixing temperature.

By "baked goods" herein is meant any bakery product having the low water levels necessary to form a water-in-oil emulsion under the conditions of bakery mixing. Water levels of from about 15% to about 60% by weight, shortening basis, are suitable. Within this range of water levels can be formulated cookies, crackers, biscuits, and the like. Cookies are an especially preferred product when prepared by this invention.

The compositions and methods of this invention are especially valuable in the production of cookies which seek to emulate the organoleptic properites of freshly baked homemade cookies. Examples of such cookies are disclosed in the applications of Hong & Brabbs, Ser. No. 107,229, filed Dec. 26, 1979 and Ser. No. 220,643, filed Dec. 29, 1980, both abandoned in favor of continuation-in-part application Ser. No. 240,051, filed Mar. 3, 1981.

The laminiated cookie system described in the Hong and Brabbs applications are also especially suitable for the practice of this invention. The outer dough layer of the laminate can be formulated along standard lines and, used in conjunction with the inner dough formulated in accordance with this invention, will mask oil bleed from the inner dough, which is usually greater in the baked goods produced by this invention, owing to the markedly increased mobility of the shortening.

All percentages herein are by weight, unless otherwise indicated.

Fluid Shortening

As described above, the shortening component of the doughs encompassed by this invention, should be fluid at the storage temperature of the resulting baked goods, typically 15–35° C. but potentially as low as 0° C. or as high as 60° C. These shortenings are typically liquid glyceride oils and should consist primarily of triglycerides. To remain liquid at lower temperatures, the shortening should contain a minimum of glycerides having melting points higher than about 15° C. so as to limit the solids increase when the shortening is cooled. It is desirable that the shortening be chemically stable and resistant to oxidation.

Suitable shortenings (oils) may be derived from naturally occurring liquid glyceride oils such as cottonseed oil, soybean oil, safflower oil, corn oil, olive oil, coconut oil, peanut oil, rapeseed oil, sesame seed oil, sunflower seed oil, and mixtures thereof. Also suitable are liquid oil fractions from palm oil, lard, and tallow, obtained, for example, by graining or directed interesterification, followed by separation of the oil. Oils predominating in glycerides of unsaturated acids may need some hydrogenation to maintain flavor, but care should be taken not to greatly increase the amount of glycerides melting above 15° C. When oils are selected which have a larger amount of solids melting between 15° C. and 40° C. than are desirable, it may be necessary to separate out the solids. Refined and slightly hydrogenated soybean oil has proved to be especially suitable. Refined cottonseed oil is also acceptable.

The fluid shortenings of this invention may include certain di- or tri-glycerides in which one or two of the OH groups of the glycerine have been replaced by acetyl, propionyl, butyrl, or caproyl radicals, and one or two other remaining OH groups of the glycerine have been replaced by acyl radicals of higher molecular weight saturated or unsaturated fatty acids having from 12 to 22 carbon atoms. For the purposes of this invention these glycerides, containing both high and low molecular weight acid radicals, are referred to as low molecular synthetic fats. The low molecular synthetic fats selected should be liquid at 15° C. In order to resist oxidation and to prevent rancidity, it is preferred to select low molecular synthetic fats in which there are a minimum of carbon-to-carbon double bonds in the higher molecular weight fatty acid radicals, and preferably not more than 2 double bonds in any single acid radical. Normally liquid fatty acids of the oleic acid series, having a single carbon-to-carbon double bond, are ideal for the purpose.

Other suitable liquid shortenings can be prepared by controlling the amount of fully hydrogenated solid fats and/or high melting mono- and diglycerides employed in, or formed in, the base oil. Examples of such opaque liquid shortenings are taught by Andre and Going, in U.S. Pat. No. 2,815,286, issued Dec. 3, 1957, the teachings of which are fully incorporated herein by reference.

Plastic fats are usually not fluid enough at baked goods storage temperatures to be effective alone in this invention. However, some 80%, more or less, of the composition of a typical plastic fat is oil, which, if separated from the accompanying solid fat, would be liquid at typical baked-good storage temperatures. The plasticity of the shortening is due to its content of solid glycerides, usually including from about 8% to about 20% of triglycerides which melt above 48° C. and which may include some solid monoglycerides and diglycerides. The crystalline form of this higher-melting fat and other solid glycerides in the plastic fat produces throughout the liquid oil (generally as the result of appropriate thermal manipulations) a network of crystals which has been linked to the network of a stack of straw. It can readily be appreciated that, by other thermal manipulations, known to the fat processing art, this network of, typically, beta phase crystals can be broken down. The resulting fat, while grainy or soupy in texture, is suitably fluid for use in the practice of this invention, and can be combined with additional liquid oil or additional hardstock materials in the practice of this invention, so long as fluidity at baked product storage temperatures is maintained.

In general, fluid shortenings can readily contain up to about 10% substantially fully saturated fatty glycerides, a substantial proportion of which are in the form of beta phase crystals. If more than about 10% solids are present, the shortening may be too viscous to be fluid at temperatures as low as 15° C., and thus, such shortenings may be undesirable where storage of baked products at low temperatures is contemplated. If the high-melting components are alpha-phase or beta-prime phase tending, other levels of these latter materials can be used while maintaining fluidity.

Alternatively, it may be desirable to incorporate separately a portion of the shortening in the dough as liquid fat, and the remainder as a plastic or hard fat. For example, it may be desirable to add separately the liquid and high melting fats of the Andre and Going compositions to the dough, instead of forming a finished shortening product prior to addition. The use of plastic or solid shortenings together with fluid shortenings is perfectly acceptable in the practice of the invention, so long as the total shortening, taken in aggregate, is fluid at the unexpected storge temperatures of the resulting baked goods and mixing is adequate to provide a relatively homogeneous distribution of the various shortening species. Precise levels tolerated will depend on the physical characteristics of the plastics/solid fats used. Mixtures containing 50% plastic fat or less are, generally, acceptable combinations.

Where it is desirable to store the baked goods at low temperatures, i.e., from about 0° C. to about 15° C., liquid oil stocks which are fluid at those temperatures and, generally, substantially free from higher melting materials should be selected. In some cases, winterization of the oils may be necessary prior to use to extract waxes and other high melting fractions.

Fluidity of the shortening at the storage temperature of the baked goods will be a determining factor in the time course of chip softening. The more mobile the shortening, the more rapid the chip softening process will be. In no instance has the chip softening effect been found to be instantaneous; product "tempering" periods of from two days to two months will commonly be necessary to allow for gradual softening of the chips.

In any case, selection of oils having appropriate melting points and remaining fluid over anticipated storage temperature ranges will be well within the skill of those familiar with fats and oils, and, by itself, constitutes only a single aspect of the present invention.

Emulsifiers

By the term "emulsifer" herein is meant either a single emulsifier or an emulsifer system comprising a mixture of emulsifiers. A wide variety of surface active emulsifiers can be used in the practice of this invention. In selecting suitable emulsifiers, materials should be selected which are of food-acceptable composition and quality; however, the key criterion for selection is that the emulsifier render the dough system oil-continuous, rather than sugar-syrup continuous. While not intending to be limited by theory, many materials which function suitably are those which are relatively lipophilic, yet interact with water to form a stable hydrated mesomorphic phase. Such mesophases behave as liquids or gels in their mechanical properties and as crystalline solids in their optical properties.

Partially esterified polyhydric compounds having surface active properties are exceptionally suitable as emulsifiers. This class of emulsifiers includes, among others, mono- and diglycerides of fatty acids which are active at dough mixing temperatures, such as monopalmitin, monolaurin and monoolein; sucrose partial fatty acid esters, such as sucrose monooleate; and partial fatty acid esters of sorbitol or its anhydrides, such as sorbitan monooleate.

Other particularly suitable emulsifiers for use in the practice of this invention are the polyglycerol esters (PGEs). Examples of PGEs are decaglycerol decoleate, triglycerol monostearate, octaglycerol monostearate, and octaglycerol monooleate. These materials are normally not obtained in pure form, but are generally the reaction products of an esterification between a preselected cut of polyglycerols and desired saturated or unsaturated fatty acids. The result is a statistical distribution of polyglycerl mono- and poly-esters determined by reactants and reaction conditions. Polyglycerol esters suitable for use in the present invention have an average of from 2 to 10 glycerol units and from 1 to 3 saturated or unsaturated fatty acyl groups of from 14 to 18 carbon atoms per polyglycerol moiety. Preferred polyglycerol esters have an average of 2 or 3 glycerol units and 1 fatty acyl group having from 14 to 18 carbon atoms per polyglycerol moiety.

Other suitable emulsifiers include commercial soybean lecithin, which is a naturally occurring mixture of similar compounds identified as phosphatides or phospholipids, namely, lecithin (phosphatidyl choline), cephalin (phosphatidylethanolamine), and related phosphorus-containing lipids.

Fractionated lecithins, which are soluble in oil and dispersible in water, are also suitable emulsifiers herein. They are commercial lecithin products in which the ratio of phosphatides has been manipulated to accentuate their emulsifying and surface active properties. These products are available commercially from a number of suppliers.

Within the foregoing described classes of compounds, those emulsifiers having hydrophilic-lipophilic balance (HLB) values of at most about 8 are particularly effective and thus preferred in the practice of this invention. HLB values are available from suppliers of emulsifiers, from standard reference texts, or can be determined by standard techniques.

The emulsifiers used in the practice of this invention will be used in quantities which are sufficient to form a water-in-oil emulsion in the dough system. In this context, the term "emulsion" is used loosely to describe a system in which oil or shortening is the continuous phase and water is the disperse phase; the water droplets are rather too large and irregular in shape for the system to be considered a true emulsion. Nonetheless, the differences between a shortening-continuous dough and a sugar-syrup-continuous dough will be immediately evident to those of skill in the food arts; for example, shortening-continuous doughs exhibit nonadherent contact surfaces, as described in the copending application of Savage, Ser. No. 239,766, filed Mar. 2, 1981. The shortening-continuous character can also be readily determined using standard light microscopy techniques to observe behavior of the shortening and water phases, suspended particulates, and dissolved solutes.

Percentages of emulsifier, by weight of shortening, can vary substantially, depending upon the emulsifying capability of the particular materials selected. For relatively active emulsifiers, such as monoglycerides, percentages may be as low as 1.3% by weight of shortening, or even less, depending upon formulation. Operability of the invention does not place an upper bound on emulsifier levels, but use of emulsifiers at levels in excess of 6 to 10% may, in some cases, be limited by organoleptic or regulatory considerations. In any event, selection of the emulsifier level is not critical, so long as sufficient emulsifier is present to form a shortening-continuous dough system. These levels, in general, will be rather higher than those normally encountered in baked-good formulation, in part because it was not heretofore appreciated that any benefits could be achieved by the use of higher emulsifier levels.

In each case, determination of emulsifier levels should be based on the quantity of active emulsifier present in the total dough system. Thus, where commercial oils or shortenings are used which contain low levels of suitable emulsifiers, those emulsifiers should be taken into account in formulating the compositions of this invention. In other cases, emulsifier "stocks" or "concentrates" will be used. In these cases, too, it is also important to gauge emulsifier levels by quantity and activity of the active emulsifier species, not the total quantity of stock or concentrate used. For example, a particularly preferred emulsifier concentrate for use in the practice of this invention is a "superglycerinated" soybean oil which contains mono-, di-, and tri-glycerides in approximate ratio of 1:1:1, and an Iodine Value of about 70. In this material, the most active emulsifier species is the monoglyceride, which accounts for approximately $\frac{1}{3}$ of the concentrate. Thus, to achieve a level of 1.3% monoglycerides by weight of shortening, 4% of the superglycerinated soybean oil concentrate must be used to achieve the desired emulsifier level. Among the more effective emulsifiers, such as monoglycerides, levels will be typically at least about 1.3%, preferably 1.5%, and most preferably 2% emulsifier, by weight of total shortening.

As described above, the desired activity of the emulsifiers herein is the formation of a shortening-continuous dough. In general, the emulsifiers should be selected which exhibit this activity in the temperature range at which the dough will be mixed, i.e., the temperature at which the shortening, with water and emulsifier will be combined to form the water-in-oil emulsion. While mixing temperatures will typically be in the range of from about 15° C. to about 35° C., other emulsifiers, having higher or lower temperature-activity ranges, can be selected to suit the dough mixing conditions in any particular application of this invention. Thus, for mixing temperatures substantially above ambient, e.g., greater than about 60° C., a superglycerinated rapeseed stock, having a high proportion of mono-$C_{22}$-glyceride, can be used. Once the emulsion is formed, it will remain stable as the temperature is lowered, even though the emulsifier is incapable of forming such a system at the lower temperatures. Similarly, for low temperature processing conditions, a low-temperature-active emulsifier such as monolaurin can be selected. For maximum flexibility in dough mixing temperatures, a combination of high- and low-temperature-active emulsifiers can be used, as is often the practice in the bakery arts.

It has been found that the water in fresh or frozen (i.e., unreconstituted) egg white is too tightly bound to the egg protein to associate with an emulsifier to form a stable shortening-continuous system. Accordingly, where the term "water" is used herein, it should be understood to exclude the water in fresh or frozen egg white. If dry egg solids are used, addition of some water will be necessary in any event to form a coherent dough mass. If fresh or frozen egg is used, additional water will be necessary to form the requisite hydrated mesophase/emulsion in conjunction with the emulsifier and shortening. In all cases, the necessary free water can easily be supplied in pure form, in fluid milk, or in a simple solution of dough formula solubles (e.g., sugar syrup).

It has also been found that preformed oil-in-water emulsions do not exhibit appropriate phase behavior and are too stable to invert to the water-in-oil emulsions required in the products of this invention. Therefore, their use in the practice of this invention should be avoided.

INDUSTRIAL APPLICABILITY

Within the limits of operability, ingredients in any common low-water, baked-good formulation can be used in the practice of this invention. In general, sugar, flour, water and shortening, when combined in most reasonable proportions, will produce a dough suitable for the practice of this invention. Of course, the sweetness, texture, and similar organoleptic properties of the baked product will depend upon the ratio of sugar/flour/water/shortening. In general, any formulation which produces an organoleptically acceptable crumb-continuous product can be employed in the practice of the present invention. Preferred formulations, such as cookie formulations, will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also fluid oils (shortening) and peanut solids which supply both carbohydrates and proteins, similar to flour. Within limits, well known to the art, materials which "interrupt" the homogeneous composition of the baked product can be introduced into the formulation. These materials are essentially inert, so far as the chemistry of the dough is concerned. Examples of such materials are chopped nuts, coconut, oatmeal, raisins, and the like. Even in simple baked products, it may be desirable to incorporate additional flavoring materials, such as spices.

The following examples illustrate the practice of this invention, while not intending to be limitative thereof.

EXAMPLES I–XI

Chocolate chip cookie doughs were prepared according to the following general formula:

| Ingredient | Wt. %, Flour basis |
| --- | --- |
| Shortening + emulsifier | 80.6 |
| Brown sugar | 60.5 |
| Granulated sugar | 60.5 |
| Fresh egg yolk | 14.5 |

-continued

| Ingredient | Wt. %, Flour basis |
| --- | --- |
| Egg white[1] | 24.2 |
| Flour, all purpose | 100.0 |
| Baking soda | 1.6 |
| Salt | 1.6 |
| Dry vanilla flavor | 0.41 |
| Semisweet chocolate chips | 68.6 |

[1]Either fresh egg white or 2.4% dried egg white solids + 21.8% distilled water.

The doughs were prepared by (1) creaming together the sugar, shortening, and emulsifier, when used; (2) mixing in the egg ingredients; (3) blending in the flour, soda, salt and vanilla; and (4) blending the chips in gently by hand.

Sixteen gram portions of the various doughs were baked on an aluminum cookie sheet for about 8.5 minutes about 190° C.

Within the foregoing formula, and using the foregoing procedure, doughs and cookies were made containing various emulsifiers, base shortenings, and forms of egg white.

Chip texture was evaluated organoleptically by small panels of experts, using a 5-point scale: (1) hard/firm; (2) firm interior/soft exterior; (3) moderately soft; (4) soft throughout; and (5) very soft/creamy. The formulations and results are indicated in the following table.

| Example | I | II | III | IV | V | VI | VII | VIII | IX | X | XI |
| --- | --- | --- | --- | --- | --- | --- | --- | --- | --- | --- | --- |
| Shortening type[2] | oil | oil | oil | oil | oil | oil | oil | oil | oil | oil | plastic fat |
| Emulsifier | none | none | MG[3] | MG | MG | MG | lecithin[6] | lecithin | MO[7] | PGE[8] | MG |
| Emulsifier level[4] | 0 | 0 | 3% | 6% | 6% | 6% | 2% | 6% | 6% | 6% | 7.5% |
| Egg white form | dried | dried | dried | dried | dried | fresh | dried | dried | dried | dried | dried |
| Tempering temperature, °C. | 21 | 32 | 21 | 21 | 21 | 21 | 21 | 21 | 21 | 21 | 21 |
| Tempering time, days | 7 | 28 | 28 | 8 | 28 | 7 | 5 | 5 | 28 | 28 | 28 |
| Chip texture[5] | 2 | 1 | 1 | 4 | 5 | 1 | 3 | 4 | 3 | 3 | 1 |

[2]Oil is liquid refined & lightly hydrogenated soybean oil (Crisco Oil TM); plastic fat is hydrogenated soybean oil plastic fat (Crisco TM).
[3]MG is superglycerinated soybean oil, Iodine Value about 70, 1:1:1 mono-: di-: triglycerides.
[4]% Emulsifier stock by weight of shortening; uncompensated for % activity of emulsifier stock.
[5]Organoleptic evalutaion, 5-point scale described above.
[6]Stated 60% active (Yelkins DS, Ross & Rowe, Inc.).
[7]MO is monoolein, laboratory grade.
[8]PGE is laborator-prepared polyglycerol ester, moderately hydrophilic, prepared as disclosed in U.S. Pat. No. 3,968,169, issued July 6, 1976, to Seiden et al., the disclosures of which are fully incorporated herein by reference. Forty-five percent of the product has from 2 to 4 glycerol units; 46% of the product is mono- or di- ester of a 45:55 mixture of palmitic and stearic acids.

In Examples I and II, the fluid shortening alone was unable to produce chip softening; in Example III, monoglyceride level (1%) was also insufficient; in Example VI, fresh egg did not supply enough free water to associated with the emulsifier; and in Example XI, the plastic fat was not sufficiently fluid at tempering temperatures to produce chip softening.

EXAMPLE XII

A two-dough laminated dough structure was prepared in the manner of the Hong and Brabbs application Ser. No. 107,229, described above, using this invention in the center dough only.

The outer dough was prepared according to the general formula of Ex's. I–XI, using plastic fat containing 4.5% superglycerinated soybean oil emulsifier concentrate and dried egg white. The inner dough was prepared using liquid soybean oil shortening containing 6% superglycerinated soybean oil emulsifier concentrate and substituting 75.6 wt. % (flour basis) high fructose corn syrup (80% solids) for the brown sugar. Added water in the inner dough was reduced to 6.6wt. % to correct for the water in the corn syrup, and the level of chips was doubled and placed in the inner dough only.

Nine gram portions of the inner dough were enrobed in 7 grams of outer dough so that the entire surface of the inner dough was uniformly covered. The resulting laminated dough strutures were baked 8.5 minutes about 190° C. For comparison,, control samples were prepared using the outer dough formulation throughout, but otherwise identical. All chips were in the inner portion.

After a 5 day tempering period at 21° C., the chips in the inner/outer test laminate cookie were judged significantly softer than those in the outer/outer cntrol laminate cookie. After 2 more days' tempering, the chips in the control laminate cookie were judged hard and brittle, while the chips in the test laminate were judged to have softened further, without loss of integrity.

EXAMPLE XIII

The following butterscotch chip formulation further illustrates the compositions of this invention.

| Ingredient | Wt. %, flour basis |
|---|---|
| Shortening | |
| Cottonseed oil 96% | |
| Monoolein 4% | |
| | 80.6 |
| Granulated cane sugar | 121.0 |
| Dried whole egg | 9.6 |
| Water | 29.0 |
| All purpose flour | 100.0 |
| Baking soda | 1.6 |
| Salt | 1.6 |
| Vanilla extract | 3.2 |
| Butterscotch flavored chips | 68.5 |

EXAMPLE XIV

In the formulation of Ex. XIII, peanut butter flavored chips can be substituted for the butterscotch flavored chips.

EXAMPLES XV-XVI

In the formulae of Examples XIII and XIV, the shortening can be replaced by

| Fat | |
|---|---|
| liquid soybean oil | 50% |
| plastic fat (soybean) | 50% |
| | 95% |
| Monolaurin | 5% |

EXAMPLES XVII-XVIII

In examples XIII and XIV, where the emulisifer is replaced by glycerol monolaurate, sorbitan monooleate, sucrose monooleate, or sorbitan monostearate, the compositions are within the scope of the invention.

EXAMPLE XIX

A peanut butter chip chocolate cookie within the scope of this invention can be prepared using the following formula:

| Ingredient | % of Flour Weight |
|---|---|
| Shortening[1] | 100.7 |
| Granulated cane sugar | 151.1 |
| Fresh egg yolk | 18.1 |
| Dried egg white | 3.0 |
| Water | 41.2 |

-continued

| Ingredient | % of Flour Weight |
|---|---|
| All purpose flour | 100.0 |
| Cocoa | 24.9 |
| Baking soda | 2.0 |
| Salt | 2.0 |
| Peanut butter chips | 80 |

[1]Pourable opaque shortening consisting of 88% lightly hydrogenated soybean oil (IV = .110), 6% soybean oil stearin fraction (IV = 45), 6% superglycerinated soybean oil (IV = 70, 35% monoglycerides).

What is claimed is:

1. A flavor chip-containing cookie dough having improved flavor chip texture after baking, comprising (a) sugar; (b) flour; (c) shortening which is fluid at cookie storage temperatures; (d) 15–60%, by weight of the shortening, of water; (e) flavor chips comprising sugar, fat and flavor ingredients and being solid at cookie storage temperatures; and (f) sufficient emulsifier active at dough mixing temperatures, to render the dough shortening-continuous, whereby migration of the fluid shortening into the flavor chips is enhanced after baking.

2. A dough according to claim 1 wherein the shortening is fluid at a temperature within the range of from about 15° to about 35° C.

3. A dough according to claim 2 wherein the shortening is a liquid triglyceride oil.

4. A dough according to claim 3 wherein the shortening is refined, lightly hydrogenated soybean oil.

5. A dough according to claim 4 wherein the shortening further contains up to about 10% substantially fully saturated fatty triglycerides.

6. A dough according to claim 2 wherein the shortening is a mixture of liquid triglyceride oil and plastic fat.

7. A dough according to claim 6 wherein the shortening is at most about 50% plastic fat.

8. A dough according to claim 1 wherein the emulisifer is active at a temperature in the range of from about 15° to about 35° C.

9. A dough according to claim 8 wherein the emulisifer has a hydrophilic-lipophilic balance of at most about 8.

10. A dough according to claim 9 wherein the emulsifier is a member selected from the group consisting of monoglycerides, lecithins, and polyglycerol esters and mixtures thereof.

11. A dough according to claim 10 wherein the monoglycerides are monoglycerides of $C_{12}$–$C_{22}$ fatty acids.

12. A dough according to claim 11 wherein the monoglyceride is monolaurin.

13. A dough according to claim 11 wherein the monoglyceride is monoolein.

14. A dough according to claim 10 wherein the lecithin is a soybean lecithin.

15. A dough according to claim 14 wherein the lecithin is a fractionated lecithin.

16. A dough according to claim 10 wherein the polyglycerol esters have an average of from 2 to 10 glycerol units and from 1 to 3 fatty acyl groups of from 14 to 18 carbon atoms per glycerol moiety.

17. A dough according to claim 16 wherein the polyglycerol esters have an average of 2 or 3 glycerol units and 1 fatty acyl group having from 14 to 18 carbon atoms per polyglycerol moiety.

18. A dough according to claim 17 wherein the polyglycerol ester is triglycerol monostearate.

19. A dough according to claim 17 wherein the polyglycerol ester is triglycerol monooleate.

20. A dough according to claim 1 wherein the emulsifier is in the form of a concentrate comprising a superglycerinated oil stock.

21. A dough according to claim 20 wherein the concentrate is a superglycerinated soybean oil comprising a mixture of mono-, di- and triglycerides in a ratio of about 1:1:1 and having an iodine value of about 70.

22. A dough according to claim 1 wherein the active emulsifier concentration is in the range of from about 1.3% to about 10% by weight of shortening.

23. A dough according to claim 22 wherein the active emulisifer concentration is in the range of from about 1.5% to about 6% by weight of shortening.

24. A dough according to claim 23 wherein the active emulsifier concentration is about 2% by weight of shortening.

25. A dough according to claim 1 wherein the flavor chips are chocolate-flavored chips, butterscotch-flavored chips, or peanut-butter-flavored chips, or a mixture thereof.

26. A method for rendering soft the flavor chips in a cookie made from dough comprising sugar, flour, shortening, 15-60%, by weight of the shortening, of water, and flavor chips comprising sugar, fat and flavor ingredients and being solid at cookie storage temperatures, comprising the steps of (a) incorporating a substantial portion of the shortening in the dough in a form which is fluid at cookie storage temperatures; an (b) adding to the dough sufficient emulsifier or emulsifiers to render the dough shortening-continuous at the dough mixing temperature, whereby migration of the fluid shortening into the flavor chips is enhanced after baking.

27. A method according to claim 26 wherein the shortening is fluid at a temperature within the range of from about 15° to about 35° C.

28. A method according to claim 27 wherein the shortening is a liquid triglyceride oil.

29. A method according to claim 28 wherein the shortening is refined, lightly hydrogenated soybean oil.

30. A method according to claim 29 wherein the shortening further contains up to about 10% substantially fully saturated fatty triglycerides.

31. A method according to claim 27 wherein the shortening is a mixture of liquid triglyceride oil and plastic fat.

32. A method according to claim 31 wherein the shortening is at most about 50% plastic fat.

33. A method according to claim 26 wherein the emulsifier is active at a temperature in the range of from about 15° to about 35° C.

34. A method according to claim 33 wherein the emulisifer has a hydrophilic-lipophilic balance of at most about 8.

35. A method according to claim 34 wherein the emulsifier is a member selected from the group consisting of monoglycerides, lecithins, and polyglycerol esters.

36. A method according to claim 35 wherein the monoglycerides are monoglycerides of $C_{12}$-$C_{22}$ fatty acids.

37. A method according to claim 36 wherein the monoglyceride is monolaurin.

38. A method according to claim 36 wherein the monoglyceride is monoolein.

39. A method according to claim 35 wherein the lecithin is a soybean lecithin.

40. A method according to claim 37 wherein the lecithin is a fractionated lecithin.

41. A method according to claim 35 wherein the polyglycerol esters have an average of from 2 to 10 glycerol units and from 1 to 3 fatty acyl groups of from 14 to 18 carbon atoms per glycerol moiety.

42. A method according to claim 41 wherein the polyglycerol esters have an average of 2 or 3 glycerol units and 1 fatty acyl group having from 14 to 18 carbon atoms per polyglycerol moiety.

43. A method according to claim 42 wherein the polyglycerol ester is triglycerol monostearate.

44. A method according to claim 42 wherein the polyglycerol ester is triglycerol monooleate.

45. A method according to claim 26 wherein the emulsifier is in the form of a concentrate comprising a superglycerinated oil stock.

46. A method according to claim 45 wherein the concentrate is a superglycerinated soybean oil comprising a mixture of mono-, di- and triglycerides in a ratio of about 1:1:1 and having an iodine value of about 70.

47. A method according to claim 26 wherein the active emulsifier concentration is in the range of from about 1.3% to about 10% by weight of shortening.

48. A method according to claim 47 wherein the active emulsifier concentration is in the range of from about 1.5% to about 6% by weight of shortening.

49. A method according to claim 48 wherein the active emulsifier concentration is about 2% by weight of shortening.

50. A method according to claim 26 wherein the flavor chips are chocolate-flavored chips, butterscotch-flavored chips, or peanut-butter-flavored chips, or a mixture thereof.

* * * * *

UNITED STATES PATENT AND TRADEMARK OFFICE
CERTIFICATE OF CORRECTION

PATENT NO. : 4,360,534

DATED : November 23, 1982

INVENTOR(S) : William J. Brabbs et al

It is certified that error appears in the above-identified patent and that said Letters Patent are hereby corrected as shown below:

On the title page, item(75), "Springfield, Ohio" should read -- Springfield Twp. Hamilton County, Ohio --.
Also on the title page of the patent, "The Proctor & Gamble Co." should be -- The Procter & Gamble Co. -- .

Col. 2, line 6, "tempertures" should read -- temperatures -- ;
Col. 2, line 9, "baked-goods" should read -- baked good -- ;
Col. 2, line 32, "properites" should read -- properties -- .

Col. 3, line 15, "butyrl" should read -- butyryl -- ;
Col. 3, line 54, "linked" should read -- likened -- .

Col. 5, line 5, "decoleate" should read -- decaoleate -- ;
Col. 5, line 25, "phosphatidylethanolamine" should read -- phosphatidyl ethanolamine -- .

Col. 7, in footnote (5) of the Example, "evalutaion" should read -- evaluation -- .

Col. 2, line 9, "baked-goods" should read -- baked-good --.

UNITED STATES PATENT AND TRADEMARK OFFICE
CERTIFICATE OF CORRECTION

PATENT NO. : 4,360,534

DATED : November 23, 1982

INVENTOR(S) : William J. Brabbs et al

It is certified that error appears in the above-identified patent and that said Letters Patent are hereby corrected as shown below:

Col. 8, line 18, -- @ -- should be inserted before "about".
Col. 8, line 49, "associated" should read -- associate -- .

Col. 9, line 5, -- @ -- should be inserted before "about";
Col. 9, line 11, "cntrol" should read -- control -- .

Signed and Sealed this

Tenth Day of May 1983

[SEAL]

Attest:

GERALD J. MOSSINGHOFF

Attesting Officer

Commissioner of Patents and Trademarks